(12) United States Patent
Borchert et al.

(10) Patent No.: US 9,180,543 B2
(45) Date of Patent: Nov. 10, 2015

(54) WELDING POWER TO AUXILIARY POWER CONVERSION SYSTEM AND METHOD

(71) Applicant: ILLINOIS TOOL WORKS INC., Glenview, IL (US)

(72) Inventors: Neal Maynard Borchert, Kaukauna, WI (US); Todd Gerald Batzler, Hortonville, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/527,502

(22) Filed: Oct. 29, 2014

(65) Prior Publication Data

US 2015/0048072 A1 Feb. 19, 2015

Related U.S. Application Data

(63) Continuation of application No. 12/488,143, filed on Jun. 19, 2009, now Pat. No. 8,884,189.

(60) Provisional application No. 61/145,341, filed on Jan. 16, 2009.

(51) Int. Cl.
  *B23K 9/09* (2006.01)
  *B23K 9/10* (2006.01)
  *B23K 9/12* (2006.01)

(52) U.S. Cl.
  CPC ............. *B23K 9/1043* (2013.01); *B23K 9/1006* (2013.01); *B23K 9/12* (2013.01)

(58) Field of Classification Search
  USPC ............... 219/130.1, 130.21, 130.31–130.33, 219/130.51, 137 PS
  See application file for complete search history.

(56) References Cited

U.S. PATENT DOCUMENTS

| | | | | |
|---|---|---|---|---|
| 5,073,695 A | * | 12/1991 | Gilliland | 219/130.31 |
| 5,708,253 A | | 1/1998 | Bloch | |
| 5,824,990 A | * | 10/1998 | Geissler et al. | 219/130.21 |
| 6,642,481 B2 | | 11/2003 | Sievert | |
| 7,528,345 B2 | * | 5/2009 | Morimoto et al. | 219/137 PS |
| 2004/0245232 A1 | * | 12/2004 | Ihde et al. | 219/137.71 |
| 2009/0039064 A1 | | 2/2009 | Enyedy | |

OTHER PUBLICATIONS

International Search Search Report for PCT/US2009/069918 mailed Feb. 25, 2010.

* cited by examiner

*Primary Examiner* — Brian Jennison
(74) *Attorney, Agent, or Firm* — Fletcher Yoder P.C.

(57) ABSTRACT

Methods and systems for manufacturing and using the auxiliary power conversion unit, which is capable of being remotely located from a welding power supply unit during a welding operation, are provided. In some embodiments, the auxiliary power conversion is capable of outputting DC as well as AC power, capable of outputting multiple voltages consistent with the demands of typical auxiliary tools, such as a hand grinder or a light. In certain embodiments, the power conversion unit may be a stand-alone system or may be incorporated into a device, such as a wire feeder, which is configured to derive power from the arc potential. The power conversion unit may contain control and processing electronics that may include a controller, a processor, memory, and so forth.

20 Claims, 11 Drawing Sheets

WELDING POWER TO AUXILIARY POWER CONVERSION SYSTEM AND METHOD

CROSS REFERENCE TO RELATED APPLICATIONS

This is a Continuation Application of U.S. patent application Ser. No. 12/488,143, entitled "Welding Power to Auxiliary Power Conversion System and Method", filed Jun. 19, 2009, which is a Non-Provisional Application of Provisional Application No. 61/145,341, entitled "Weld Voltage to Auxiliary Power Converter for Tools", filed Jan. 16, 2009, both of which are herein incorporated by reference.

BACKGROUND

The present disclosure relates generally to welding power sources, and more particularly, to systems and methods for providing auxiliary power at the location of the weld.

Welding is a process that has increasingly become ubiquitous in all industries. While such processes may be automated in certain contexts, a large number of applications continue to exist for manual welding operations. While the power requirements of the weld creation process remain central to a manual welding operation, additional auxiliary power requirements may also be necessary for weld joint preparation and clean up. For instance, lights, hand grinders, torch cooler pumps, and so forth, may require an additional 115V or 230V AC output.

Some welding power sources provide auxiliary AC outlets to meet this demand. However, the welding power source may be located far from the location of the weld creation. It is now recognized that this may inconveniently necessitate the use of extension cords that carry the auxiliary power from the welding power source to the location of the weld creation. It is now recognized that these extension cords contribute to power losses since the power may be transferred long distances. Additionally, since these extension cords terminate in the same general location as the weld cables used to power the weld creation process, it is now recognized that they contribute to cable clutter in and around the weld area. Further, inefficiencies may result from the use of such cables due to misplacement, borrowing, and theft of the extension cables.

BRIEF DESCRIPTION

The present disclosure is directed to systems and methods relating to an auxiliary power conversion unit for use in a welding system. In some embodiments, the auxiliary power conversion unit is capable of outputting DC as well as AC power and is capable of outputting multiple voltages consistent with the demands of typical auxiliary tools, such as a hand grinder, a light, and so forth. In particular, the present disclosure provides methods and systems for manufacturing and using the auxiliary power conversion unit, which is capable of being remotely located from a welding power supply unit during a welding operation. The power conversion unit is capable of drawing power from an arc potential via an electrode cable and a work cable and is sufficiently portable to facilitate easy replacement or transfer between welding systems. In certain embodiments, the power conversion unit may be a stand-alone system or may be incorporated into a device, such as a wire feeder, which is configured to derive power from the arc potential. In some embodiments, the power conversion unit may include an interface that includes a display panel configured to display operating parameters, such as the level of power output, the mode of operation, and so forth, to the user. The power conversion unit may contain control and processing electronics that may include a controller, a processor, memory, and so forth.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As discussed in further detail below, various embodiments of an auxiliary power conversion unit for use in a welding system are provided in accordance with present embodiments. The auxiliary power conversion unit is electronic, capable of outputting DC as well as AC power, and capable of outputting multiple voltages (e.g. 115V, 230V, etc.) consistent with the demands of typical auxiliary tools (e.g. hand grinder, light, etc.). The auxiliary power conversion unit is also capable of being remotely located from a welding power supply unit during a welding operation. The power conversion unit is capable of drawing power from an arc potential via an electrode cable and a work cable and is sufficiently portable to facilitate easy replacement or transfer between welding systems. Furthermore, the power conversion unit may be a stand-alone system or may be incorporated into a device, such as a wire feeder, which is configured to derive power from the arc potential.

The power conversion unit may include an interface that includes a display panel configured to display operating parameters, such as the level of power output, the mode of operation, and so forth, to the user. Additionally, the interface may include a power switch and visual indicators of system parameters, such as the power state of the system, temperature overload, and so forth. The power conversion unit may contain control and processing electronics that may include a controller, a processor, memory and so forth. The memory may include volatile or non-volatile memory, such as read only memory (ROM), random access memory (RAM), magnetic storage memory, optical storage memory, or a combination thereof. Furthermore, control parameters may be stored in the memory along with code configured to provide a specific output (e.g. increase/decrease power supply output based on the auxiliary load demands).

Figure 1:
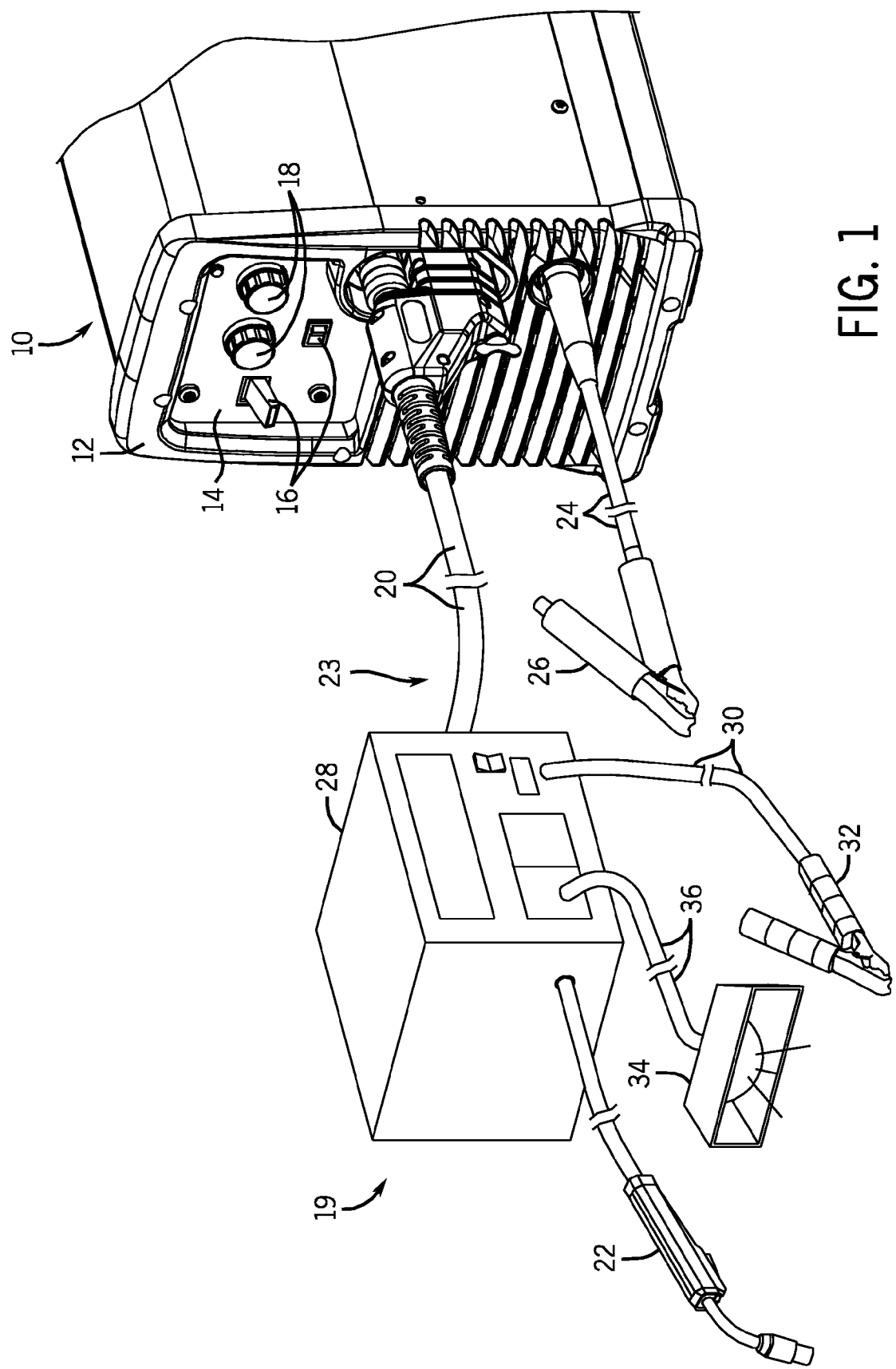
FIG. 1 illustrates an exemplary welding power supply where a power conversion unit is located along an electrode cable in accordance with aspects of the present disclosure.

Turning now to the drawings, FIG. 1 illustrates an exemplary welding power supply 10, which functions to power, control and provide consumables to a welding operation and auxiliary equipment in accordance with aspects of the present disclosure. An interface panel 12 on the front side of the power supply unit 10 in the illustrated embodiment contains a control panel 14, through which a user may control the supply of materials, such as power, gas flow, and so forth, to a welding operation, via switches 16, knobs 18, and so forth. In some embodiments, the power supply unit 10 may be communicatively coupled to additional system components, such as a wall power outlet, a battery, engine-driven power sources, and so forth. An electrode assembly 19 extends from the power supply unit 10 to a remote location where a weld may take place. A first cable 20 and a welding electrode 22 couple to the power supply unit 10 as components of an electrode assembly 23. The electrode assembly 23 extends from the power supply unit 10 to a remote location where a weld may take place. It should be noted that the electrode 22 may be an electrode suitable for a variety of welding processes. For instance, the electrode 22 may be a torch suitable for metal inert gas (MIG) operations, a stinger suitable for stick welding operations, and so forth.

A second cable 24 connects a work lead clamp 26 to the power supply unit 10. During operation, the work lead clamp 26 typically connects to a workpiece to close the circuit between the electrode 22, the work piece, and the supply unit 10, and to ensure proper current flow. In the illustrated embodiment, an exemplary auxiliary power conversion unit 28, which derives power from the arc potential and converts this power to an output suitable for auxiliary load requirements, is positioned along the length of the first cable 20 as an integral feature of the cable 20. Since the power conversion unit 28 is connected to the first cable 20, the unit 28 may be remotely located from the power supply unit 10, which enables the power conversion unit 28 to be located in close proximity to a weld without the use of extension cords. A third cable 30 connects a clamp 32 to the power conversion unit 28. During operation, the clamp 32 typically connects to the workpiece to place the power conversion unit 28 across the welding output, allowing it to derive power from the arc potential. Auxiliary equipment, such as a light 34, may plug into the power conversion unit 28 and extend to the location of its use via an additional cable 36.

Figure 2:
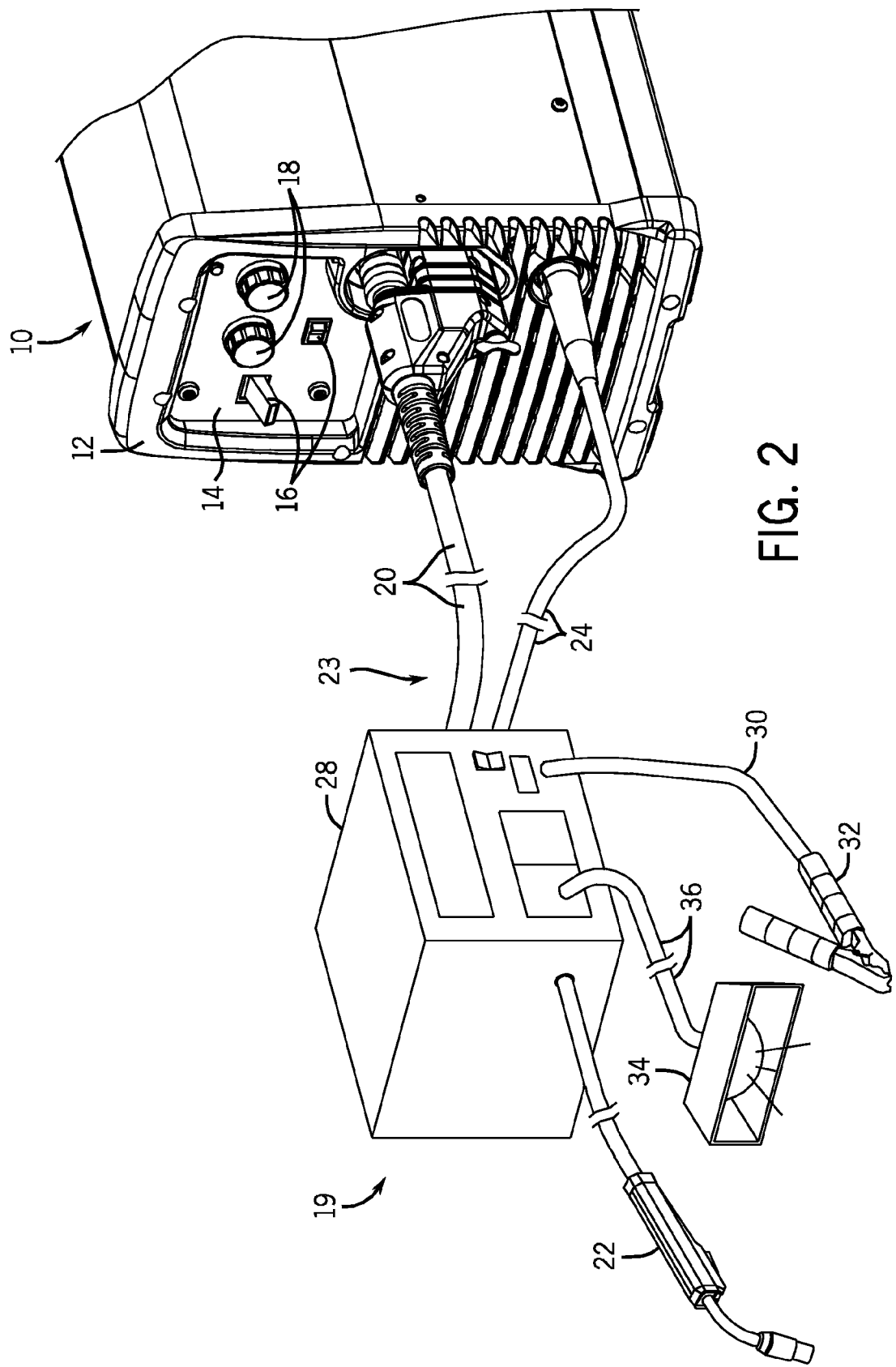
FIG. 2 illustrates an exemplary welding power supply where a power conversion unit is located along an electrode cable and a lead cable in accordance with aspects of the present disclosure.

FIGS. 2-6 illustrate alternative placements of the power conversion unit 28 with respect to the power supply unit 10 and the electrode 22. FIG. 2 illustrates a further embodiment of the configuration shown in FIG. 1. In the embodiment illustrated in FIG. 2, the work lead clamp 26 may be eliminated with respect to FIG. 1. The second cable 24 may then be connected to the auxiliary power conversion unit 28. In the illustrated embodiment, two cables 20 and 24, are used to connect the auxiliary power conversion unit 28 to the power supply unit 10. However, in further embodiments, a single supply cable (not shown) may connect the auxiliary power conversion unit 28 to the power supply unit 10. In such an embodiment, the single supply cable would still include at least two conductors such that both internal components of the first cable 20 and internal components of the second cable 24 would still be connected to the auxiliary power conversion unit 28.

Figure 3:
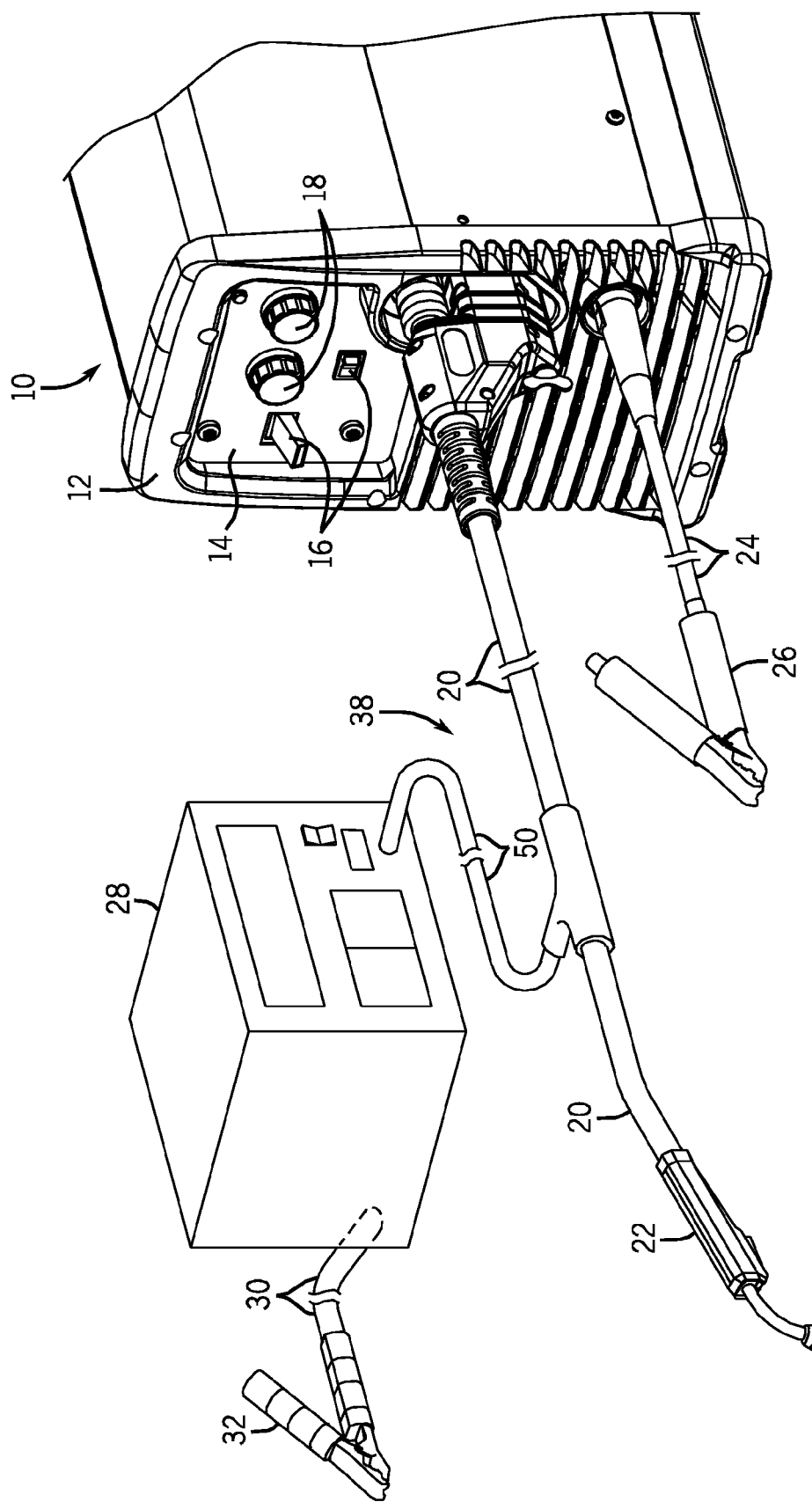
FIG. 3 illustrates an exemplary welding power supply where a power conversion unit connects to an electrode cable via an supplemental cable in accordance with aspects of the present disclosure.
Figure 4:
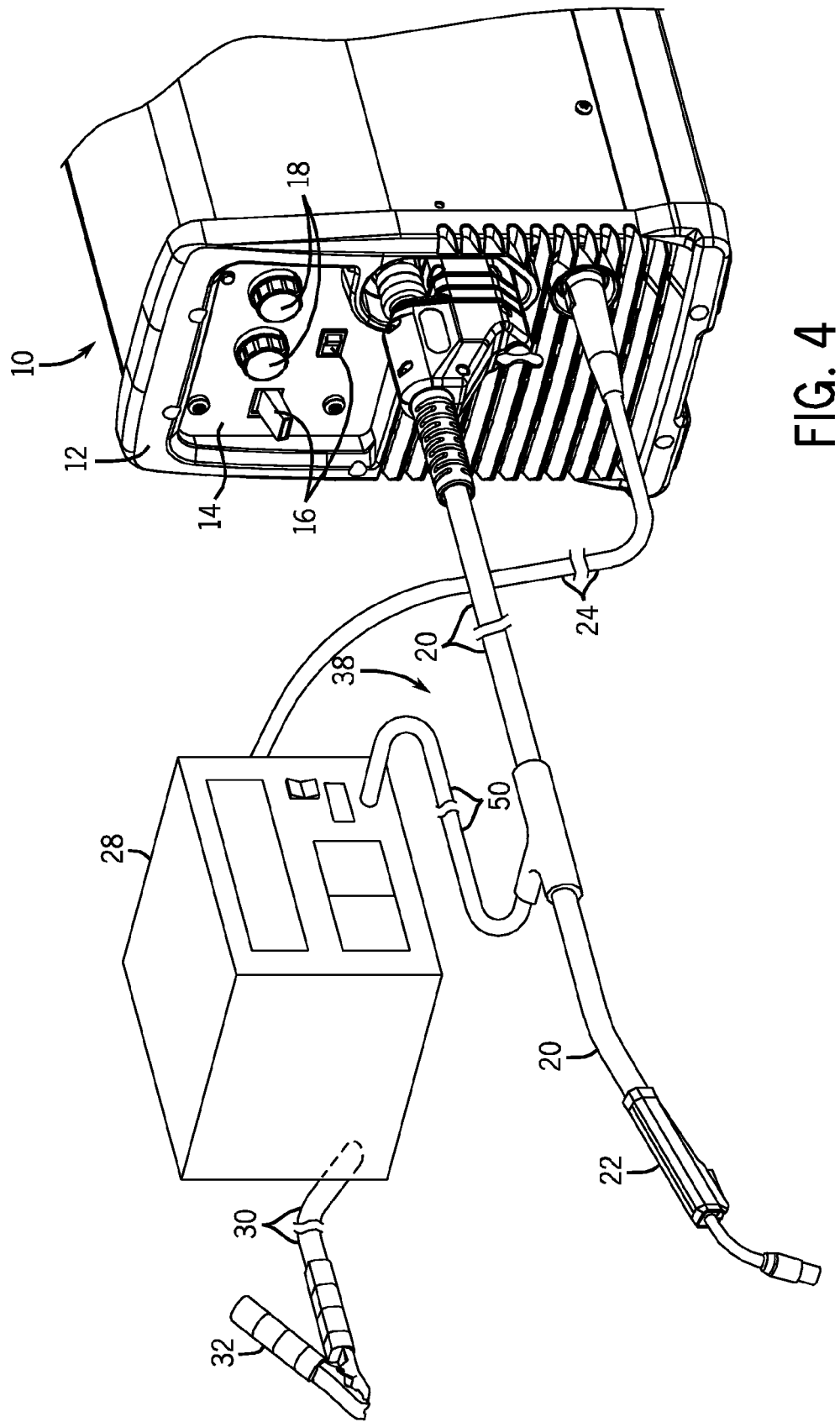
FIG. 4 illustrates an exemplary welding power supply where a power conversion unit connects to an electrode cable via an supplemental cable and to a lead cable in accordance with aspects of the present disclosure.

In the embodiment illustrated in FIG. 3, an electrode assembly 38 and the work lead assembly 23 extend from the power supply unit 10 to a remote location where a weld may take place. The power conversion unit 28 is connected to the first cable 20 via a fourth cable 50, which branches off from the first cable 20. During operation, the work lead clamp 26 and the clamp 32 connect to the workpiece. During operation, the work lead clamp 26 closes the circuit between the electrode 22, the work piece, and the supply unit 10, and ensures proper current flow. The clamp 32 places the power conversion unit 28 across the welding output, allowing it to derive power from the arc potential. Auxiliary equipment, such as lights, hand grinders, and so forth, may plug into the power conversion unit 28 and extend to the location of their use via additional cables such as the cables that are provided as features of the auxiliary equipment. FIG. 4 illustrates a further embodiment of the configuration shown in FIG. 3. In the embodiment illustrated in FIG. 4, the work lead clamp 26 may be eliminated with respect to FIG. 3. In this embodiment, the second cable 24 may then be connected to the auxiliary power conversion unit 28.

Figure 5:
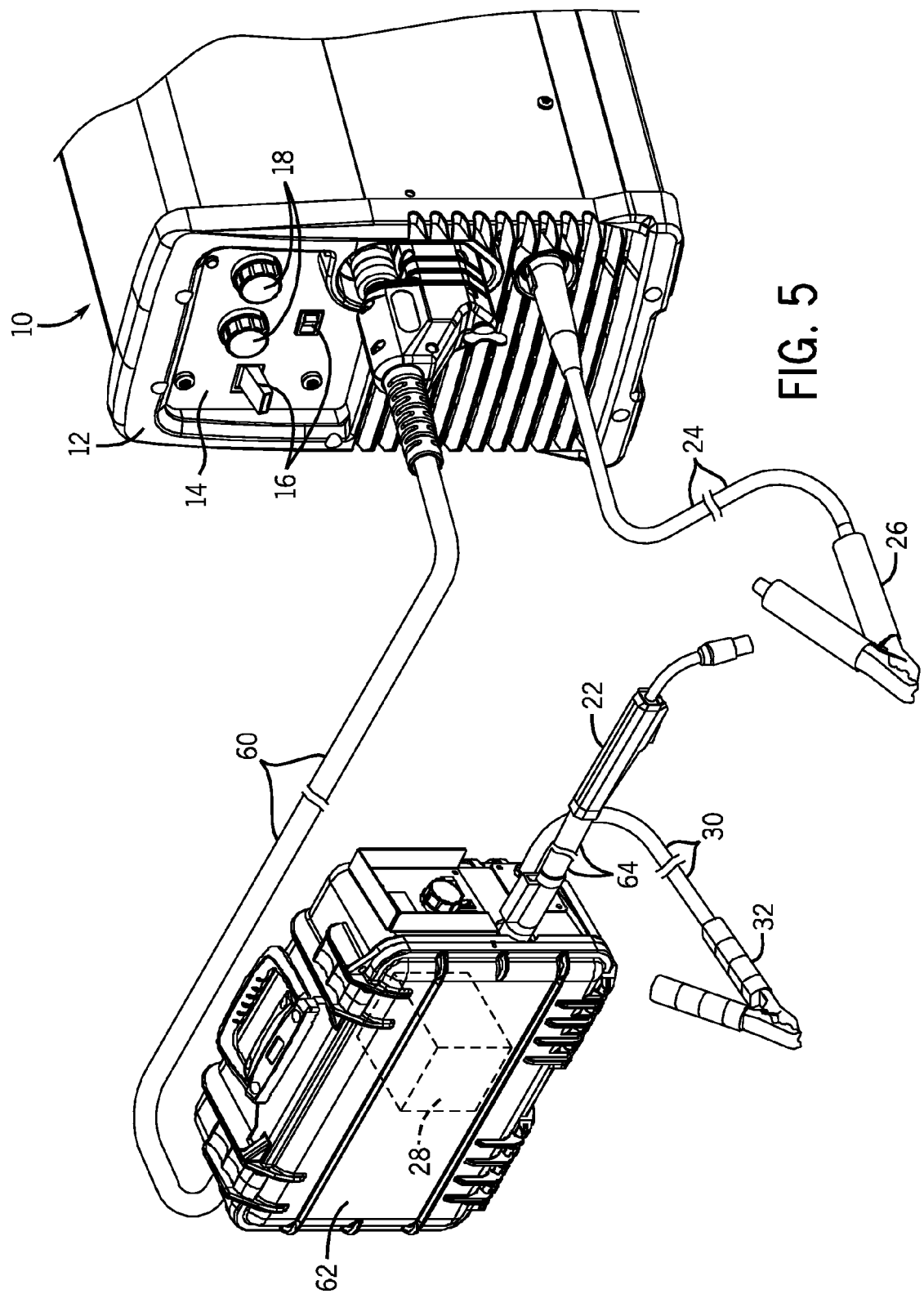
FIG. 5 illustrates an exemplary welding power supply where a power conversion unit is located inside a wire feeder in accordance with aspects of the present disclosure.

In the embodiment illustrated in FIG. 5, the work lead clamp 26 is still connected to the power supply unit 10 via the second cable 24 with respect to FIGS. 1 and 3. However, a cable 60 connects a wire feeder, which feeds electrode wire to the welding operation, to the power supply unit 10. An additional cable 64 connects the wire feeder 62 to the welding electrode 22. In this embodiment, the power conversion unit 28 is located inside the wire feeder 62 and the clamp 32 connects to the wire feeder 62 via its cable 30. During operation, the clamp 32 connects to the workpiece to place both the wire feeder 62 and the power conversion unit 28 across the arc potential. In other embodiments, the power conversion unit 28 may be placed in other equipment as long as a connection exits such that the equipment is located across the arc potential to enable it to derive power. The illustrated embodiment may allow for less clutter around the weld compared to traditional systems, since the unit 28 is incorporated into a preexisting system component.

Figure 6:
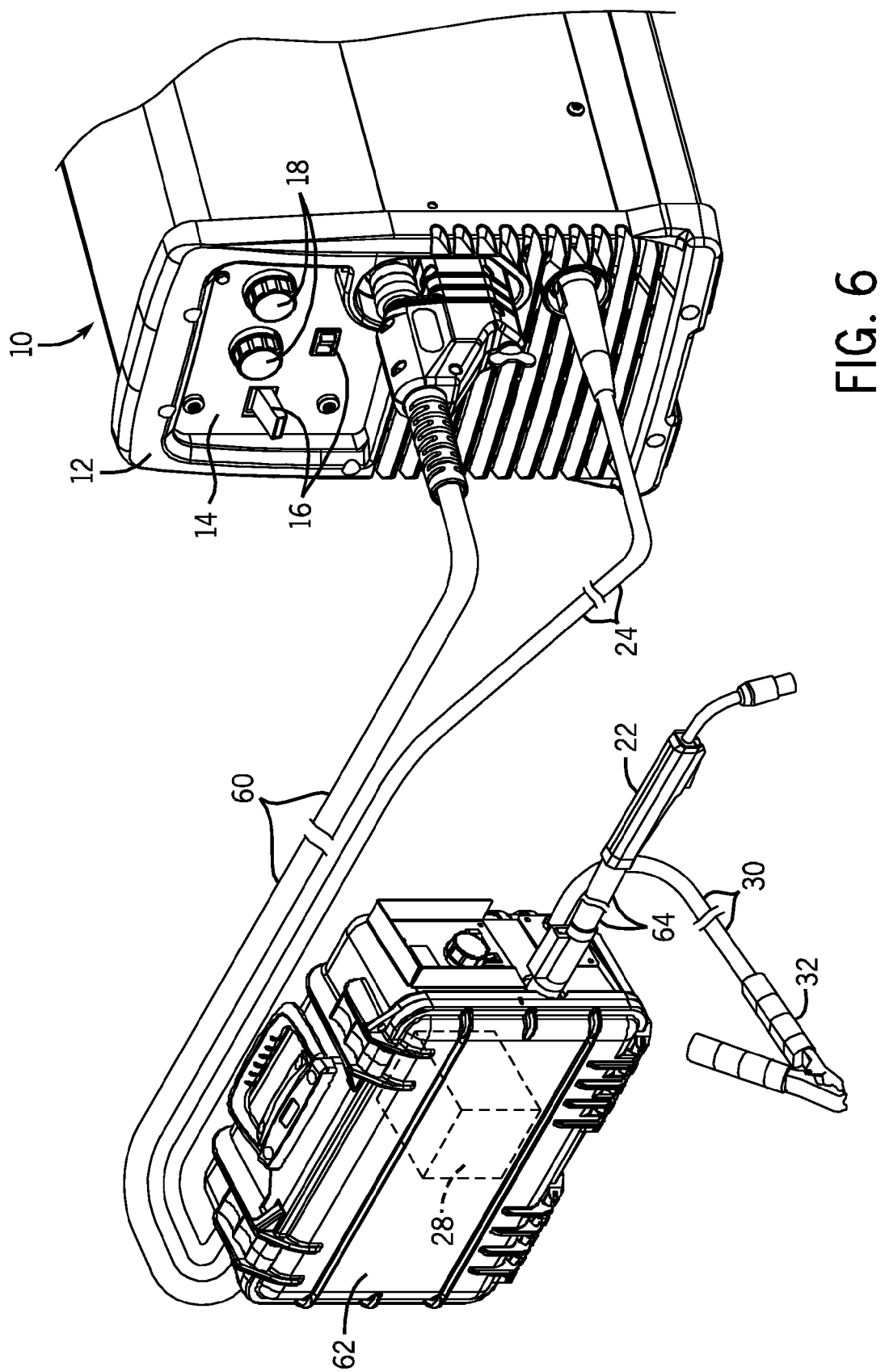
FIG. 6 illustrates an exemplary welding power supply where a power conversion unit is located inside a wire feeder and connects to a lead cable in accordance with aspects of the present disclosure.

FIG. 6 illustrates a further embodiment of the configuration shown in FIG. 5. In the embodiment illustrated in FIG. 6, the work lead clamp 26 may be eliminated with respect to FIG. 5. The second cable 24 may then be connected to the auxiliary power conversion unit 28. In the illustrated embodiment, the two cables 60 and 24, are used to connect the auxiliary power conversion unit 28 to the power supply unit 10. However, in further embodiments, a single supply cable (not shown) may connect the auxiliary power conversion unit 28 to the power supply unit 10. In such an embodiment, the single supply cable would still include at least two conductors such that both internal components of the first cable 60 and internal components of the second cable 24 would still be connected to the auxiliary power conversion unit 28.

Figure 7:
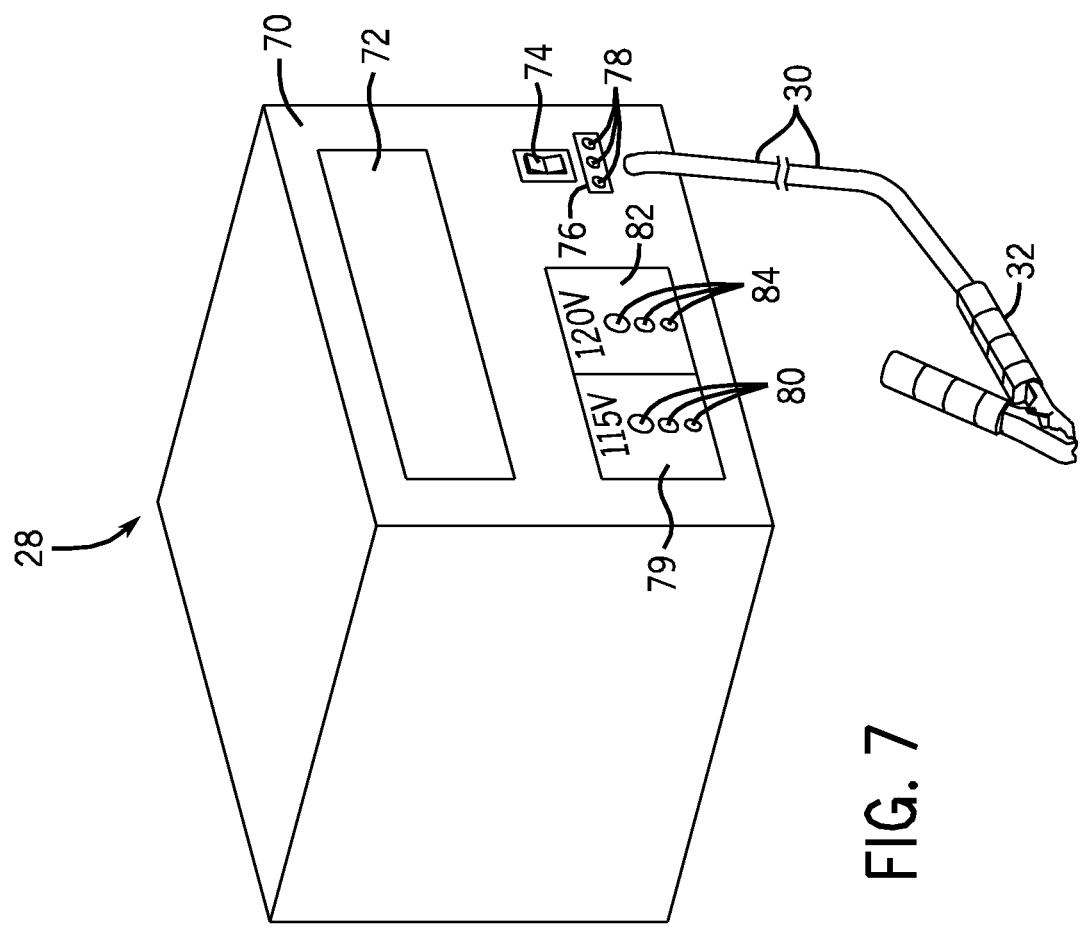
FIG. 7 illustrates an exemplary stand-alone power conversion unit in accordance with aspects of the present disclosure.

FIG. 7 illustrates the stand-alone version of the power conversion unit 28. The power conversion unit 28 may contain a front panel 70 that includes a user interface, through which the user may control the operation of the unit 28. A display panel 72 is configured to display operating parameters, such as the level of power output, the mode of operation, and so forth, to the user during operation. A switch 74 allows the user to power the unit 28 on and off. An indicator panel 76 includes indicators 78 that may indicate to the user that the unit 28 is powered on, overheating, and so forth. In the illustrated stand-alone embodiment, the clamp 32 communicatively attaches to the unit via the front panel 70 of the power conversion unit 28 to allow the unit 28 to be placed across the arc potential. In the illustrated embodiment, the front panel 70 includes a panel 79 that contains outlets 80 for auxiliary equipment that runs off of an 115V AC output and another panel 82 that contains outlets 84 for auxiliary equipment that runs off a 230V AC output. In other embodiments, more or less panels with more or less outlets than illustrated may be included on the front panel 70. For instance, outlets that output other voltages consistent with the requirements of additional auxiliary equipment may be included. Additionally, panels that include outlets which output DC voltages may be included. In certain embodiments, an exemplary front panel 70 may include outlets for both AC and DC voltage outputs.

Figure 8:
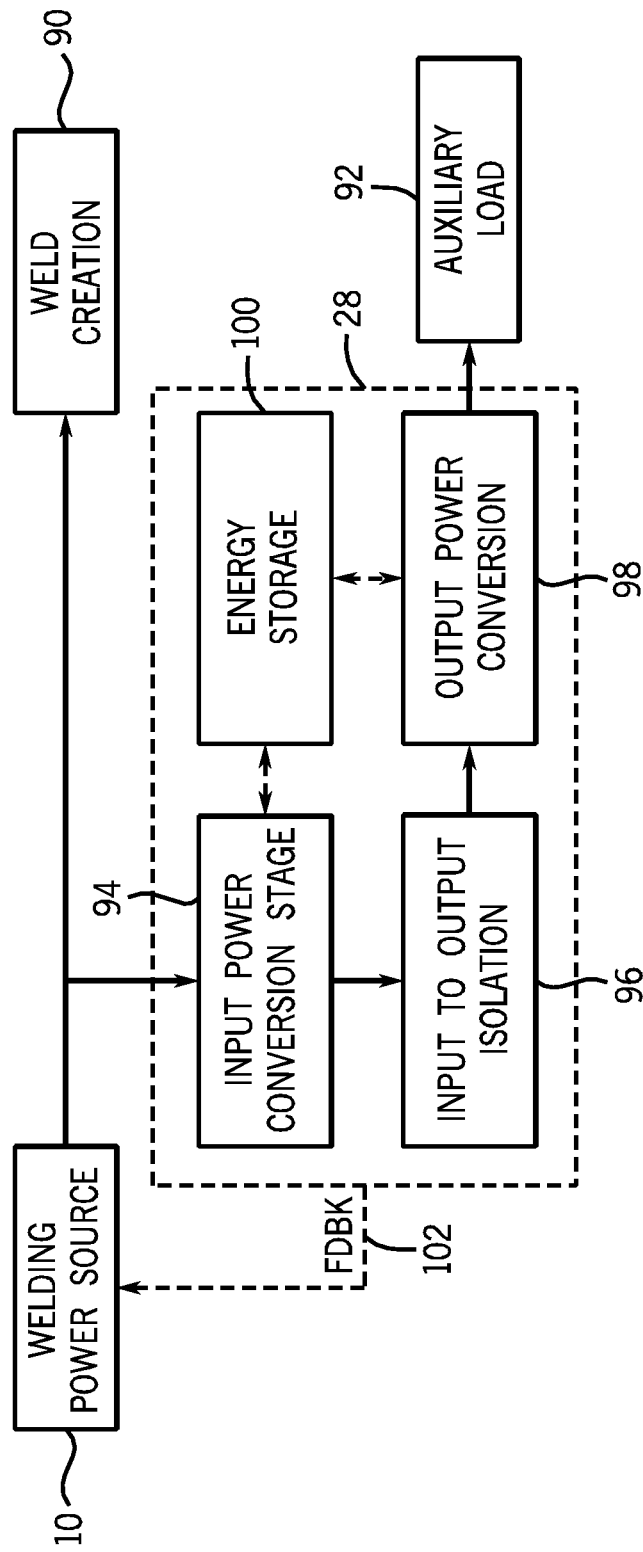
FIG. 8 is a block diagram illustrating exemplary internal components of a power conversion unit in accordance with aspects of the present disclosure.

FIG. 8 is a block diagram illustrating the internal components of the power conversion unit 28 and how they interface with the welding power source 10 and a weld creation process 90. The welding power source 10 may be a constant voltage or constant current source. Typically, the output of the power source 10 will be a low voltage (e.g. 40-50V), high current (e.g. 1000 A) waveform that is consistent with the demands of the weld creation process 90. However, the power requirements at an auxiliary load 92, such as a drill or a hand grinder, will typically necessitate a high voltage (e.g. 115V, 165V, 230V, etc.), low current (e.g. 12 A, 16 A, 20 A, etc.) output. To achieve the power requirements at an auxiliary load 92, an input power conversion stage, as represented by block 94, may be included in the power conversion unit 28. In certain embodiments, the input power conversion stage 94 may consist of two conversion steps. The first step may include a boost converter, which boosts the low voltage output of the welding power source 10 to a higher voltage more suitable for the requirements at the auxiliary load 92. The second step may include a DC to AC inverter. In other embodiments, the input power conversion stage 94 only includes the DC to AC inverter, which is used to allow power transmission to the next stage, the input to output isolation stage, as represented by block 96.

The input to output isolation stage 96 may include a transformer, such as a high-frequency ferrite-based transformer, which isolates an auxiliary circuit from a welding power circuit. In other embodiment, the input to output isolation stage 96 may include other devices, such as a switched or charge pumped capacitor network, a coupled magnetic device, and so forth. The isolation stage 96 is used to keep the auxiliary circuit at a potential distinct from a potential of the welding power supply 10. The output of the isolation stage 96 may be received by an output power conversion stage, as represented by block 98. During operation, the output power conversion stage 98 converts the output of the isolation stage 96 to the waveform used at the auxiliary load 92. For instance, if the auxiliary load 92 requires a DC voltage output, the conversion stage 98 may include a rectifier and a filter to change the high frequency AC voltage on the secondary winding of the transformer in the isolation stage 96 back to a DC voltage. If the auxiliary load 92 requires a modified or true sine wave AC output, then the conversion stage 98 may include the rectifier and a half-bridge or full-bridge inverter that shape the output wave. In some embodiments, the auxiliary load 92 may require an approximately 50 or 60 Hz waveform.

It should be noted that the illustrated stages may be combined or eliminated based on the requirements at the auxiliary load 92. Further, certain stages may be performed in addition to the three illustrated central stages. For instance, an energy storage device (e.g. a battery), as represented by block 100, may be included in the power conversion unit 28. The inclusion of the energy storage device 100 may be a way to mitigate transient load requirements by providing all or some of the power needed at the auxiliary load 92 during peak periods. The energy storage device 100 may then recharge from the welding power source 10 or from various outputs in the auxiliary storage device 19 during steady-state operation. This may be particularly useful when using auxiliary loads 92 that may require high transient peak output requirements but low average requirements. Additionally, the energy storage device, as represented by block 100, may allow for delivery of power to auxiliary loads 92 at levels that exceed the maximum amount of excess energy supplied by the power supply 10.

The power conversion unit 28 may include circuitry that provides feedback 102 to the welding power source 10. This feedback 102 may communicate a need for the welding power source 10 to increase voltage output when a level of auxiliary power needed is greater than that which is needed for the welding operation. For instance, consider a constant current power supply 10 being used for stick welding. If the power supply 10 was set to 80 A for a ⅛" E6010-5P electrode, the average output power would be in the range from 2000-2400 Watts. However, a typical auxiliary load 92, such as an 8" large hand grinder or a small torch cooler pump, may transiently require more than 2000-2400 Watts to properly start. The feedback 102 would be necessary in this situation to communicate the additional power need of the auxiliary load 92 to the power supply 10.

Figure 9:
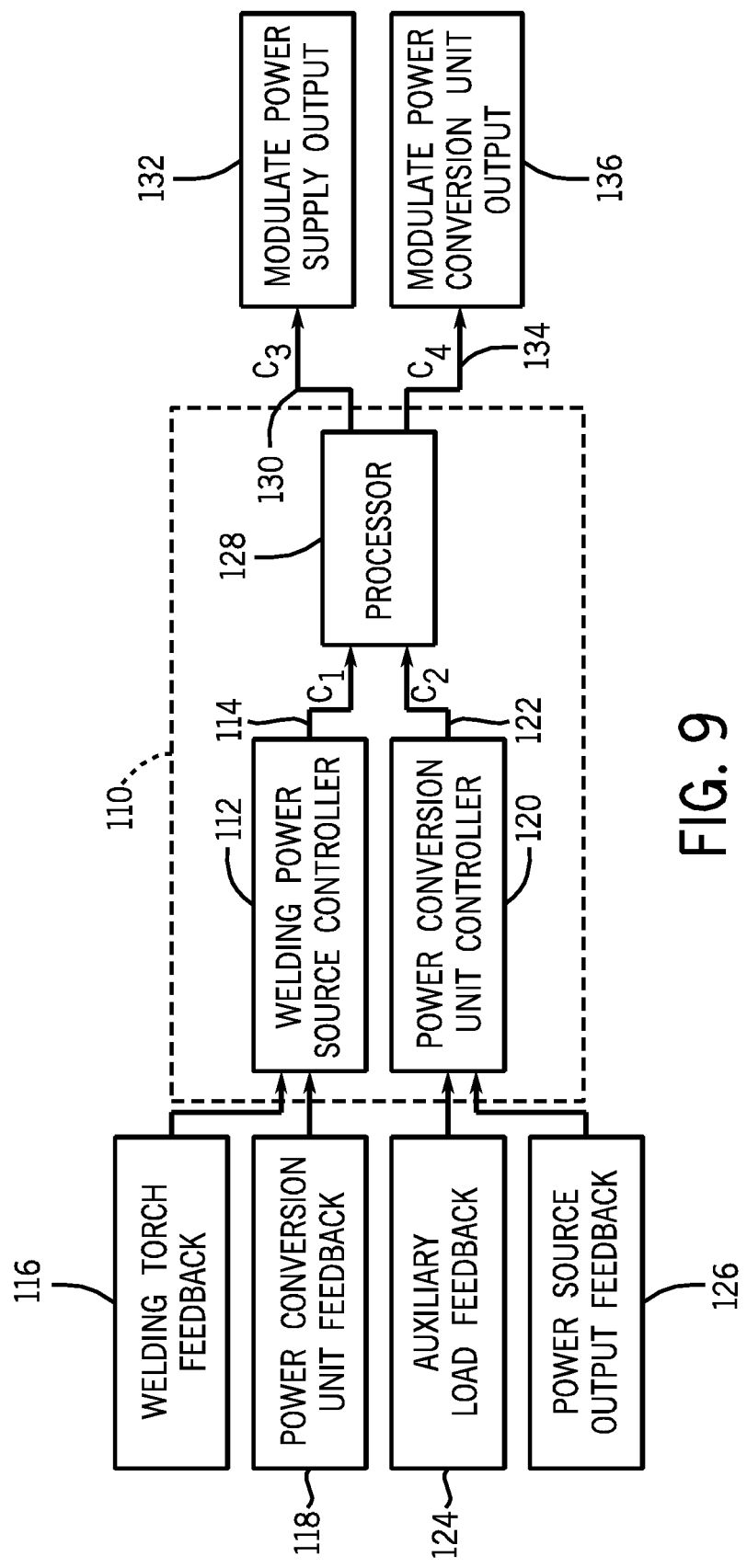
FIG. 9 is a block diagram of an exemplary controller that may be used to control the operation of a welding power source and a power conversion unit in accordance with aspects of the present disclosure.

FIG. 9 illustrates an exemplary controller 110 that may be used to control the circuitry in the welding power source 10 and the power conversion unit 28. The controller includes a welding power source controller, as represented by block 112, which compiles inputs relating to the power source output and power demands and outputs an appropriate control signal 114. The welding power source controller 112 receives feedback from the location of the welding electrode, as represented by block 116, regarding the power demands at the welding operation. Additionally, the power source controller 112 receives feedback from the power conversion unit 28, as represented by block 118, regarding the power requirements at the auxiliary load 92. The controller 110 also includes a power conversion unit controller, as represented by block 120, which compiles inputs relating to the auxiliary load 92 power requirements and outputs an appropriate control signal 122. The power conversion unit controller 120 receives feedback from the auxiliary load 92, as represented by block 124. For instance, the controller 120 may receive feedback indicating that a transient increase in voltage is needed to start a tool. Additionally, the power conversion unit 28 controller 120 may receive feedback from the power source 10 such as voltage or current sensor information that indicates how much power is being output by the power source 10. A processor 128 receives the control signals 114, 122, processes information from the control signals 114, 122 and outputs a control signal 130 that modulates the power supply 10 output, as represented by block 132, and a control signal 134 that modulates the output of the power conversion unit 28, as represented by block 136.

Figure 10:
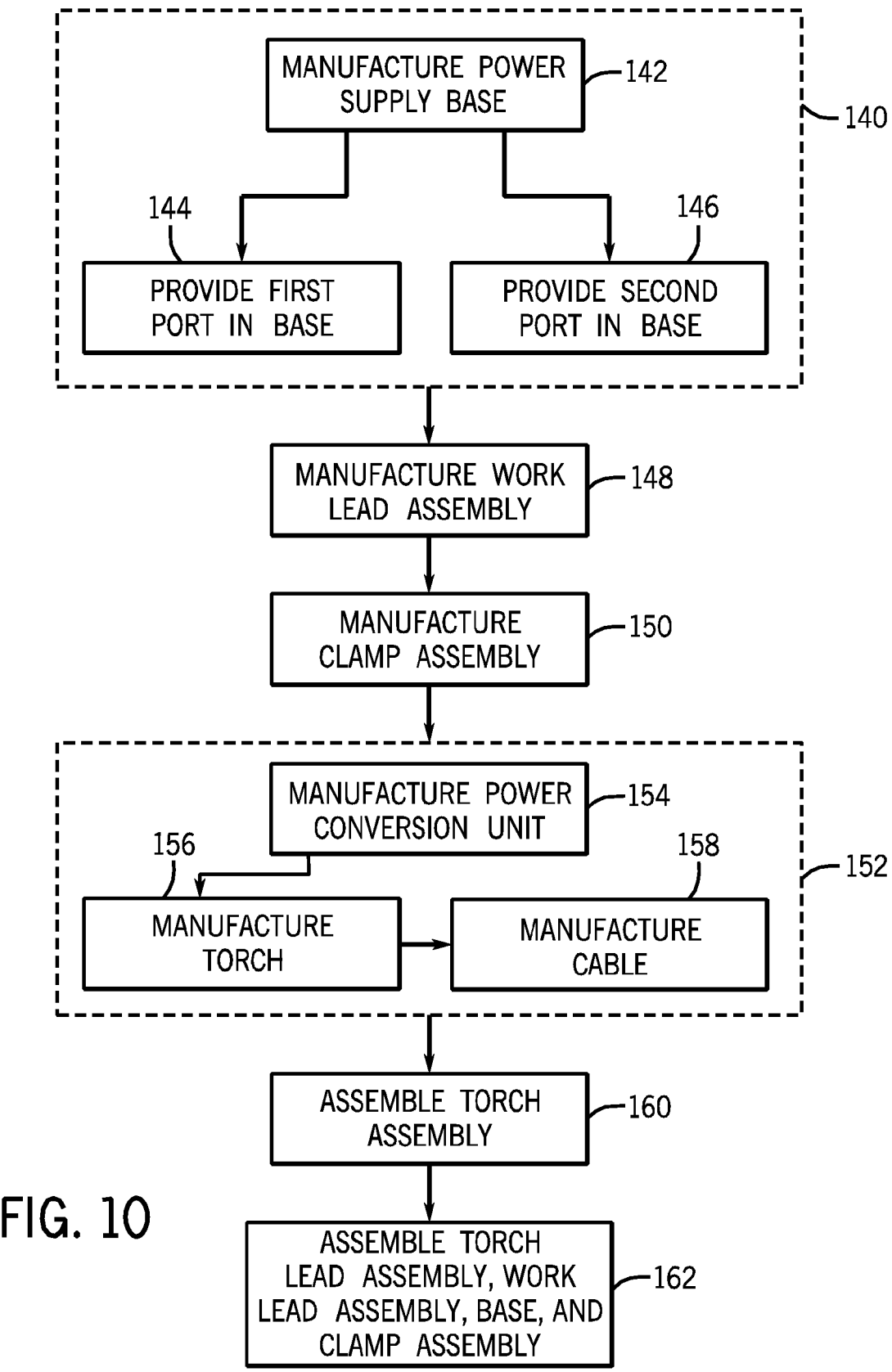
FIG. 10 illustrates an exemplary method of manufacturing the exemplary welding power supply system of FIG. 1 in accordance with aspects of the present disclosure.
Figure 11:
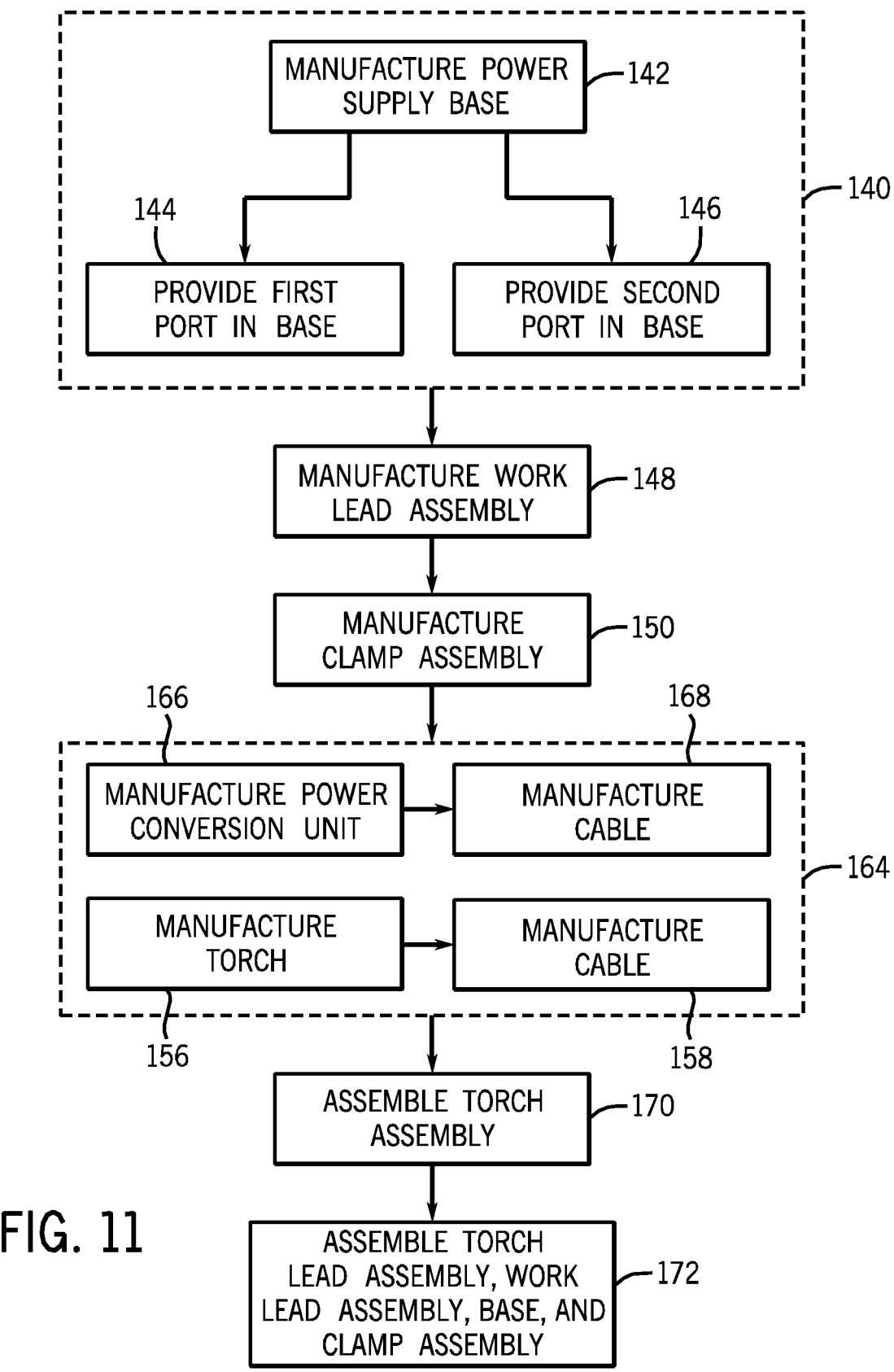
FIG. 11 illustrates an exemplary method of manufacturing the exemplary welding power supply system of FIG. 3 in accordance with aspects of the present disclosure.

FIGS. 10 and 11 illustrate methods of manufacturing the embodiments of the present disclosure illustrated in FIGS. 1 and 3, respectively. The process of manufacturing the embodiment illustrated in FIG. 1 begins with manufacturing the power supply unit 10, as represented by block 140 in FIG. 10. First, the power supply base may be manufactured, as represented by block 142. Subsequently, a first port is provided in the base, as represented by block 144, and a second port is manufactured in the base, as represented by block 146. After the power supply unit 10 has been manufactured (i.e. block 140 is complete), the work lead assembly 23 is manufactured, as represented by block 148. Subsequently, the clamp assembly 30, 32 is manufactured, as represented by block 150. Next, the electrode assembly 19 is manufactured, as represented by block 152. First, the power conversion unit 28 is manufactured, as represented by block 154. Next, the electrode 22 is manufactured, as represented by block 156, and the cable 20 that connects the electrode 22 to the power supply unit 10 and the power conversion unit 28 is manufactured, as represented by block 158. After the electrode assembly 19 has been manufactured (i.e. block 152 is complete), the electrode assembly 19 is then assembled, as represented by block 160. Finally, the components manufactured in blocks 140, 148, 150 and 152 may be assembled, as represented by block 162. In other embodiments, the components manufactured in blocks 140, 148, 150 and 152 may remain unassembled until use.

The process of manufacturing the embodiment illustrated in FIG. 3 begins with manufacturing the power supply unit 10, as represented by block 140 in FIG. 11. First, the power supply base may be manufactured, as represented by block 142. Subsequently, a first port is provided in the base, as represented by block 144, and a second port is also provided in the base, as represented by block 146. After the power supply unit 10 has been manufactured (i.e. block 140 is complete), the work lead assembly 23 is manufactured, as represented by block 148. Subsequently, the clamp assembly 30, 32 is manufactured, as represented by block 150. Next, the electrode assembly 38 is manufactured, as represented by block 164. First, the power conversion unit 28 is manufactured, as represented by block 166, and the cable 50 that connects the unit 28 to the electrode cable 20 is manufactured, as represented by block 168. Next, the electrode 22 is manufactured, as represented by block 156, and the cable 20 that connects the electrode 22 to the power supply unit 10 is manufactured, as represented by block 158. After the electrode assembly 19 has been manufactured (i.e. block 164 is complete), the electrode assembly 38 is then assembled, as represented by block 170. Finally, the components manufactured in blocks 140, 148, 150 and 164 may be assembled, as represented by block 172. In other embodiments, the components manufactured in blocks 140, 148, 150 and 164 may remain unassembled until use.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An auxiliary power conversion device, comprising:
    an input power converter capable of receiving an input voltage from a welding power supply unit connected to the auxiliary power conversion device, wherein the input power converter is capable of converting the input voltage received from the welding power supply unit to a first alternating current (AC) output;
    an input-to-output isolation circuit, wherein the input-to-output isolation circuit is capable of receiving the first AC output and maintaining an auxiliary load at a different potential than the welding power supply unit, wherein the input-to-output isolation circuit is configured to transform the first AC output to a second AC output; and
    an output power converter capable of converting the second AC output to a desired frequency and a desired waveform for the auxiliary load.

2. The auxiliary power conversion device of claim 1, wherein the input power converter is a boost converter capable of boosting the input voltage from the welding power supply unit to the first AC output having a higher voltage than the input voltage.

3. The auxiliary power conversion device of claim 1, wherein the desired frequency is approximately 50 Hz or approximately 60 Hz.

4. The auxiliary power conversion device of claim 1, comprising an energy storage module configured to be charged by the first AC output, the second AC output, or the input voltage when a demand level from the auxiliary load is less than a supply level of the second AC output.

5. The auxiliary power conversion device of claim 4, wherein the energy storage module comprises a storage device that provides power during transient auxiliary load events.

6. The auxiliary power conversion device of claim 1, comprising an energy storage module that is recharged when the auxiliary load requires less energy than available excess energy from the welding power supply unit.

7. The auxiliary power conversion device of claim 1, wherein the input-to-output isolation circuit comprises a high frequency ferrite-based transformer.

8. The auxiliary power conversion device of claim 1, wherein the auxiliary power conversion device comprises a portable enclosure that houses the input power converter, input-to-output isolation circuit, and the output power converter, and connects to the auxiliary load.

9. The auxiliary power conversion device of claim 8, wherein the portable enclosure is separate from the welding power supply unit.

10. The auxiliary power conversion device of claim 1, wherein the auxiliary power conversion device comprises a portable enclosure that is configured to attach between the welding power supply unit and a welding process.

11. The auxiliary power conversion device of claim 10, wherein the portable enclosure is separate from the welding power supply unit.

12. The auxiliary power conversion device of claim 10, wherein the portable enclosure is a wire feeder.

13. The auxiliary power conversion device of claim 1, wherein the input-to-output isolation circuit comprises a high frequency transformer and a high frequency inverter.

14. The auxiliary power conversion device of claim 1, wherein the input-to-output isolation circuit comprises a coupled magnetic device.

15. A welding system comprising:
    a welding power supply unit;
    an electrode assembly comprising an electrode cable configured to connect to the welding power supply unit;
    an auxiliary assembly comprising an auxiliary cable and an auxiliary clamp configured to be connected to a workpiece; and an auxiliary power conversion device configured to connect to the electrode assembly and the auxiliary assembly, to create alternating current (AC) power from an arc potential created by the welding power supply unit, to convert the AC power to a desired frequency and a desired waveform for one or more auxiliary devices connected to the auxiliary assembly, and to supply the converted AC power to the one or more auxiliary devices.

16. The welding system of claim 15, wherein the auxiliary power conversion device is configured to communicatively couple the one or more auxiliary devices with the arc potential.

17. The welding system of claim 15, wherein the auxiliary power conversion device comprises a portable enclosure separate from the welding power supply unit.

18. The welding system of claim 15, wherein the auxiliary power conversion device is located in a portable wire feeder.

19. The welding system of claim 15, wherein the auxiliary power conversion device attaches to the electrode cable via the auxiliary cable.

20. The welding system of claim 15, comprising a lead assembly comprising a lead cable and a work lead clamp configured to be connected to a workpiece.

* * * * *